United States Patent
Stuck (10) Patent No.: US 7,038,172 B1
(45) Date of Patent: May 2, 2006

(54) CONVEYORIZED FOOD BROILING APPARATUS

(75) Inventor: Robert M. Stuck, Charlotte, NC (US)

(73) Assignee: Marshall Air Systems, Inc., Charlotte, NC (US)

( * ) Notice: Subject to any disclaimer, the term of this patent is extended or adjusted under 35 U.S.C. 154(b) by 0 days.

(21) Appl. No.: 10/844,306

(22) Filed: May 12, 2004

Related U.S. Application Data (60) Provisional application No. 60/471,291, filed on May 16, 2003.

(51) Int. Cl.
  *F27B 9/40* (2006.01)

(52) U.S. Cl. .................. 219/388; 219/492; 219/494; 99/443 C; 374/155; 374/149

(58) Field of Classification Search .................. None
  See application file for complete search history.

(56) References Cited

U.S. PATENT DOCUMENTS

| | | | | |
|---|---|---|---|---|
| 1,774,433 A | * | 8/1930 | Gardiner .................. 99/443 C |
| 3,333,476 A | * | 8/1967 | Hardy et al. .................. 374/155 |
| 3,651,405 A | * | 3/1972 | Whitney et al. ....... 340/870.18 |
| 4,176,554 A | * | 12/1979 | Kazmierowicz ............ 374/137 |
| 4,245,613 A | | 1/1981 | Wells et al. ............... 126/19 R |
| 4,360,277 A | * | 11/1982 | Daniel et al. ................. 374/137 |
| 4,463,437 A | * | 7/1984 | Schenck et al. ............. 374/137 |
| 4,554,437 A | | 11/1985 | Wagner et al. ............... 219/388 |
| 4,613,739 A | | 9/1986 | Richards ...................... 219/718 |
| 4,718,776 A | * | 1/1988 | Gilland et al. .............. 374/170 |
| 5,132,914 A | | 7/1992 | Cahlander et al. .......... 364/478 |
| 5,179,265 A | | 1/1993 | Sheridan et al. ............ 219/497 |
| 5,197,375 A | * | 3/1993 | Rosenbrock et al. .......... 99/328 |
| 5,253,564 A | | 10/1993 | Rosenbrock et al. .......... 99/328 |
| 5,352,866 A | | 10/1994 | Cartwright et al. ......... 219/497 |
| 5,490,449 A | | 2/1996 | Meister et al. ................ 99/330 |
| 5,596,514 A | | 1/1997 | Maher, Jr. et al. .......... 364/569 |
| 5,634,719 A | * | 6/1997 | La Neve ..................... 374/155 |
| 5,821,503 A | * | 10/1998 | Witt .......................... 219/388 |
| 5,942,142 A | * | 8/1999 | Forney et al. .............. 219/388 |
| 6,142,065 A | * | 11/2000 | Panella et al. ................ 99/468 |
| 6,384,381 B1 | | 5/2002 | Witt et al. .................. 219/411 |
| 6,440,361 B1 | | 8/2002 | Weng ............................ 422/3 |
| 6,511,223 B1 | * | 1/2003 | Austen et al. .............. 374/166 |
| 6,518,550 B1 | | 2/2003 | Weng ......................... 219/497 |
| 6,624,396 B1 | * | 9/2003 | Witt et al. .................. 219/497 |

* cited by examiner

*Primary Examiner*—Joseph Pelham
(74) *Attorney, Agent, or Firm*—Kennedy Covington Lobdell & Hickman, LLP (57) ABSTRACT

A programmable control system for a cooking apparatus having a housing defining a cooking chamber with one or more food transport conveyors traveling there-through between opposing cooking elements. A food probe is provided for insertion into cooked food items to ascertain the internal cooked temperature and a control program to automatically call for the probing of temperature readings of food items on a predefined schedule, and to record the temperature readings. The control program also compensates for temperature degradation when the apparatus is under significant cooking loads. The control program also compensates for the malfunction in the cooking elements, wherein if one cooking element on one side of the conveyor path malfunctions, a corresponding heating element on the opposite side of the conveyor is deactivated and simultaneously the conveyor speed is slowed to compensate for the reduction in heating to maintain balanced cooking of the food.

18 Claims, 6 Drawing Sheets

CONVEYORIZED FOOD BROILING APPARATUS

CROSS-REFERENCE TO RELATED APPLICATION

This application is entitled to the benefit of, and claims priority to, provisional U.S. Patent Application Ser. No. 60/471,291 filed May 16, 2003 and entitled "CONVEYORIZED FOOD BROILING APPARATUS," the entirety of which is incorporated herein by reference.

BACKGROUND OF THE INVENTION

The present invention relates generally to conveyorized apparatus and methods for cooking foods and, in particular, to such apparatus and methods adapted for use in a commercial restaurant setting for broiling meats (e.g., hamburgers, beef steaks, chicken fillets, etc.).

Commercial restaurants, particularly those restaurants commonly referred to as "fast food" restaurants such as typically specialize in serving hamburgers, chicken and like sandwiches, are continually striving to reduce operating costs while at the same time increasing food cooking production and efficiency. Toward this end, many such restaurants have begun in recent years to utilize conveyorized cooking apparatus by which cooking times and temperatures can be better regulated than by more traditional manual cooking while at the same time eliminating or at least reducing the need for skilled labor.

Generally, such apparatus have generally been designed for a dedicated function which promotes reliable cooking consistency. For example, typical conventional conveyorized hamburger broiling apparatus are equipped with a single conveyor operating in a dedicated cooking chamber. Such apparatus may provide the capability for adjusting the temperature in the chamber and the traveling speed of the conveyor, whereby adjustments can be made for different food products (hamburgers of varying thicknesses or chicken fillets).

SUMMARY OF THE INVENTION

In light of this general state of the art, the present apparatus and the methodology of its operation are intended and designed to provide a novel control system for conveyorized cooking apparatus, particularly broiling apparatus such as used in fast food restaurants, which will provide various diagnostics and communication abilities while also being easy to use.

Briefly summarized, the present invention resides in an automated control system for various features of a conveyorized food cooking apparatus such as conveyorized broiling apparatus commonly utilized in fast food hamburger and chicken restaurants. Such conveyorized broiling equipment basically comprises a housing defining a cooking chamber through which an endless conveyor travels to transport hamburger patties, chicken fillets, etc., to be broiled between two sets of heating units (typically either electrical heating units or gas—fired burners) facing each other from opposite sides of the conveyor path.

The present invention utilizes a programmable electronic controller-based system for regulating various aspects of the cooking process, e.g., conveyor speed, heater temperatures, etc. Among others, three novel features are incorporated into the control system. First, the system includes a food probe connected into the control system, whereby the probe can be inserted into cooked food items to ascertain the internal cooked temperature of the item. The control system can be programmed to automatically call for the probing of temperature readings of food items on a regular schedule, and to record the values taken. The system can be programmed to wait a pre-determined period of time after insertion of the probe to take the temperature reading. Each reading can be time and date stamped for later analysis. The system can also be programmed to shut down the apparatus if acceptable temperatures are not reached within a specified period of time after a given setting (e.g., a given food recipe) is input.

A second feature provides a means for compensating for temperature degradation when the apparatus is under conditions of significant cooking loads, such as during peak restaurant business hours. Ideally, the heaters in the apparatus are controlled to achieve a consistent pre-determined set point temperature. However, when utilized to cook a significant volume of food, there is a tendency for the temperature to degrade and for the normal feedback control adjustment loop to have difficulty recovering and maintaining the set point temperature. Under extreme conditions, this could potentially affect the thoroughness of the cooking process. According to this feature of the present invention, the controller monitors deviations from the set point temperature and, if the deviation, either above or below the set point temperature, exceeds a certain pre-determined percentage deviation (e.g., five percent) for greater than a pre-determined amount of time, then the speed of conveyor travel is adjusted to either decrease the speed and thereby increase cooking time in the case of a loss of temperature or to increase conveyor speed and decrease cooking time in the case of a temperature increase.

A third feature seeks to compensate for the possibility of a malfunction in any of the cooking elements. In an electric broiler, multiple heating elements are arranged on each side of the conveyor path. In the event one cooking element on one side of the conveyor path malfunctions, an undesirable imbalance in cooking could result. Hence, this feature of the invention would provide that a corresponding heating element on the opposite side of the conveyor would be intentionally deactivated under such circumstances in order to balance the cooking of both sides of products transported on the conveyor. Simultaneously, the conveyor speed would be adjusted to slow the conveyor travel in order to compensate for the reduction in heating and thereby maintain thorough cooking of the food products.

Additionally, the present apparatus and its method of operation provide software for the controller which is accessible by authorized personnel so that various parameters can easily be modified, referred to herein as "low-level programming." More specifically, the low-level programming of the present invention may be accomplished from a user interface or through a so-called palmtop computer with IR output or through an RS485 port of the controller to a PC.

BRIEF DESCRIPTION OF THE DRAWINGS

The present apparatus and its method of operation may be understood with reference to the accompanying drawings.

DESCRIPTION OF THE PREFERRED EMBODIMENTS

Referring now to the accompanying drawings and initially to FIGS. 1–4, a conveyorized cooking apparatus according to the present invention is shown generally at 10 in an embodiment thereof particularly designed and intended for use in a "fast-food" style restaurant serving a variety of differing broiled meat sandwiches, e.g., hamburger sandwiches, chicken fillet sandwiches, steak sandwiches, etc. However, those persons skilled in the art will readily recognize and understand that the present cooking apparatus and the novel features utilized therein are susceptible of various other specific embodiments, all of which are intended to be within the scope and substance of the present invention.

Figure 1:
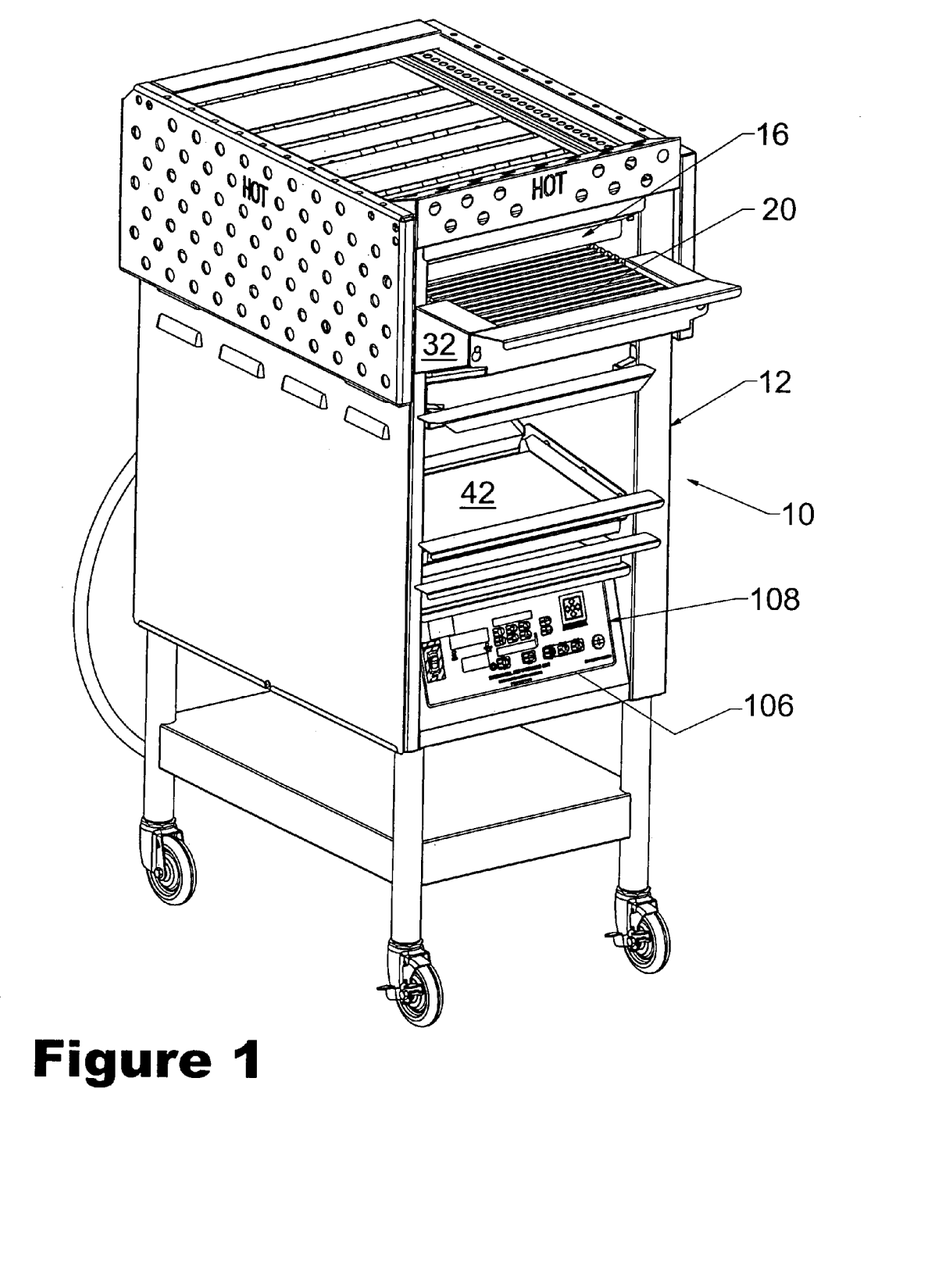
FIGS. 1 and 2 are overall left and right front perspective views of a cooking apparatus in accordance with a preferred embodiment of the present invention.
Figure 2:
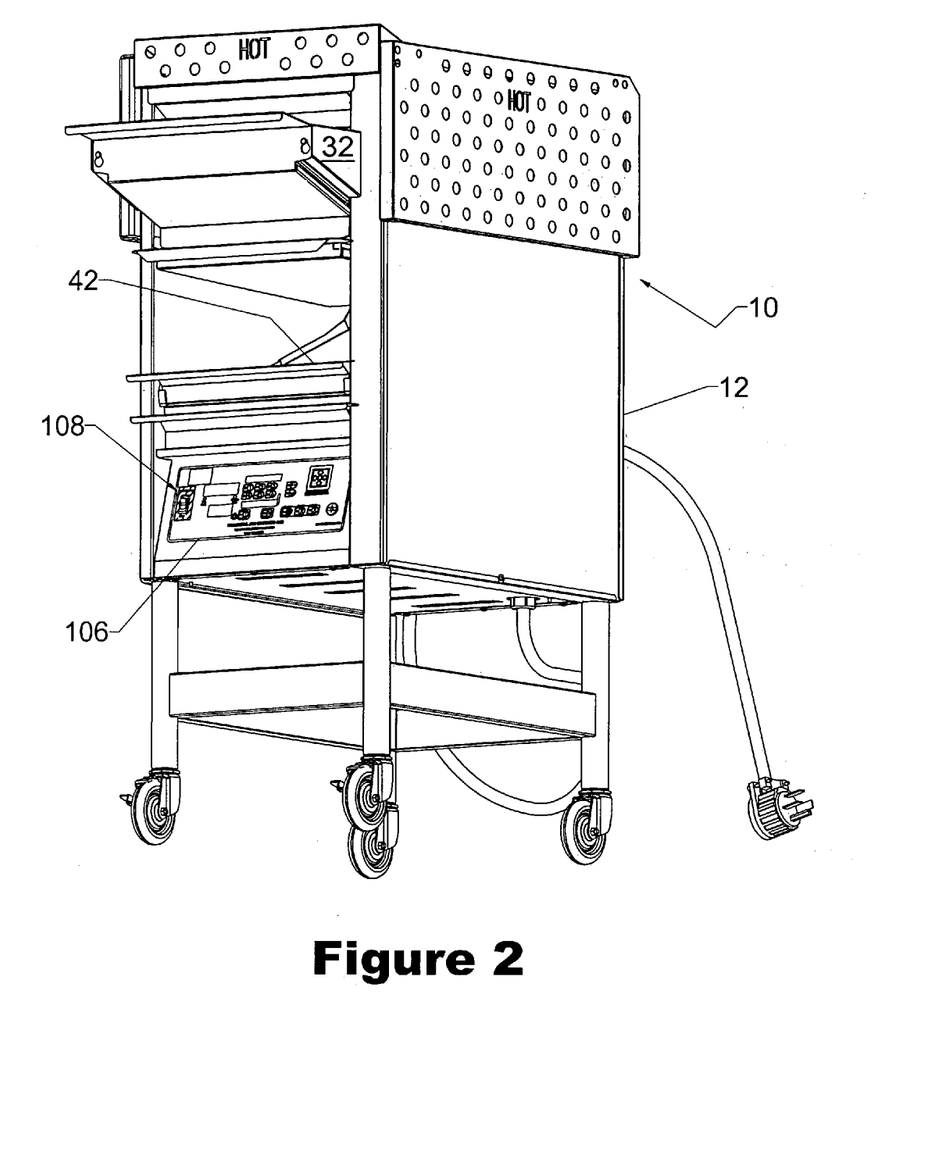
Figure 3:
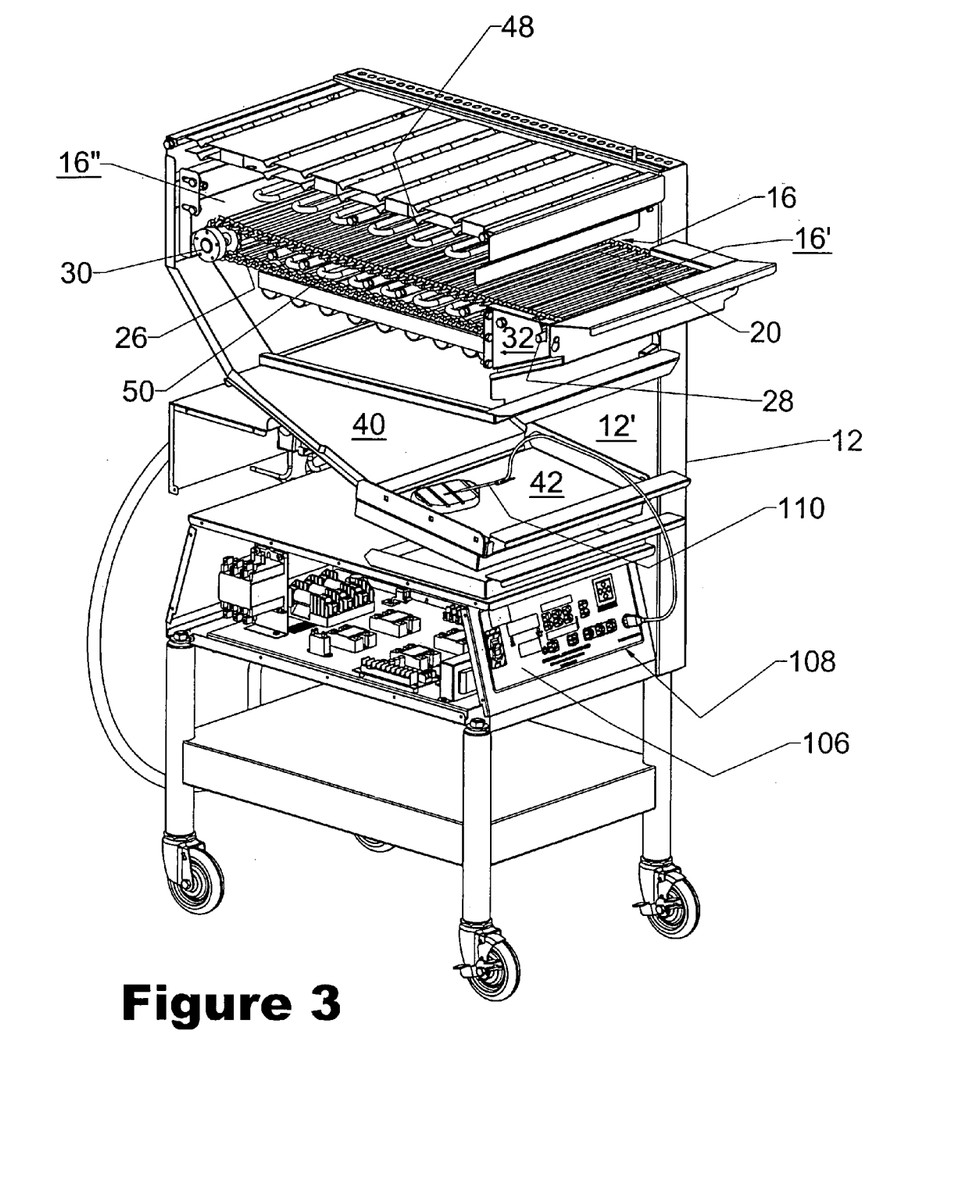
FIG. 3 is a left side perspective view of the cooking apparatus of FIGS. 1 and 2, with the housing broken away to reveal the conveyor, the heating elements and the hardware of the control system.
Figure 4:
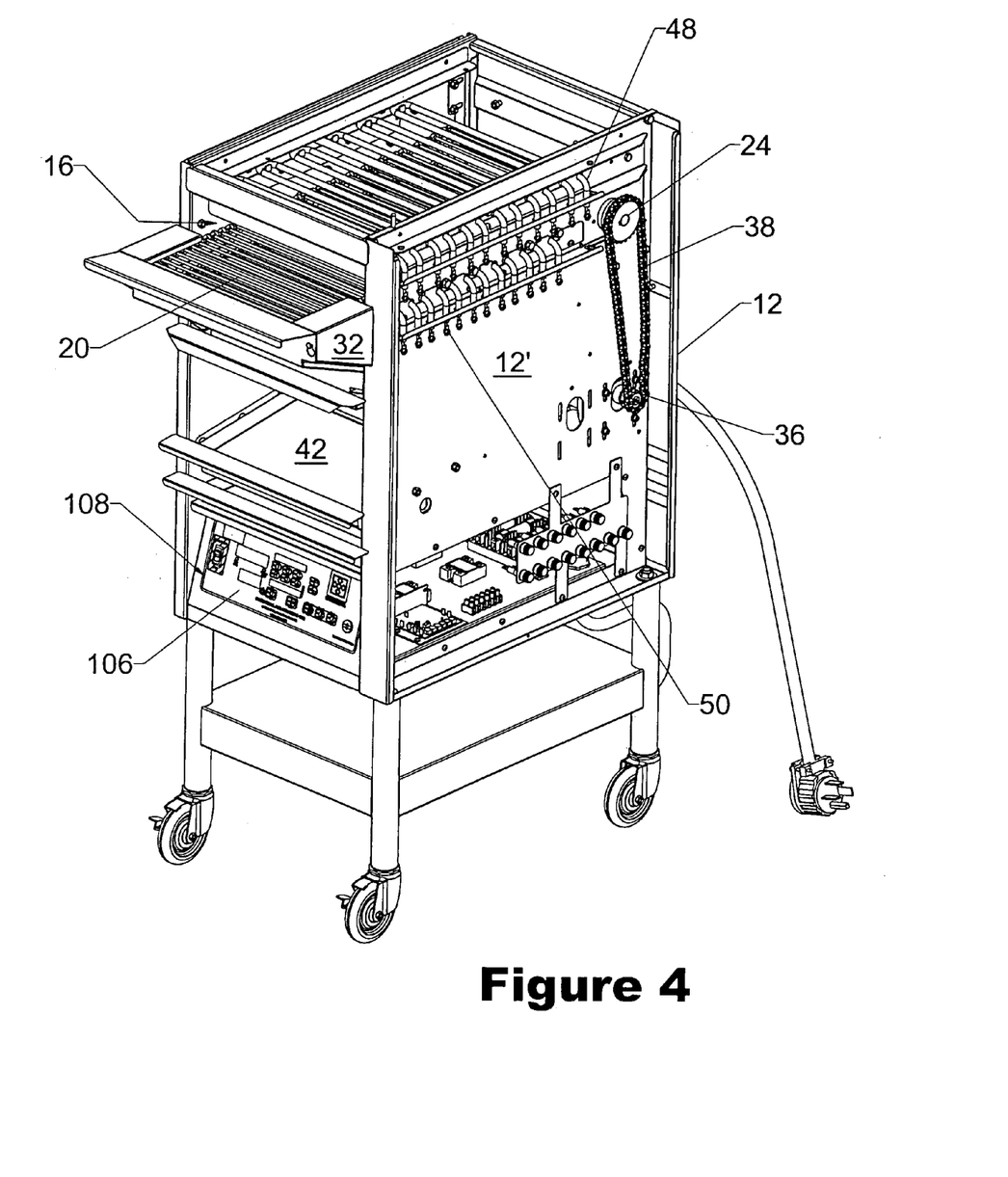
FIG. 4 is a right side perspective view of the cooking apparatus of FIGS. 1 and 2, with the housing broken away to reveal the conveyor drive, the heating elements and the hardware of the control system.

As depicted in FIGS. 1–4, the cooking apparatus 10 includes a housing 12 defining an interior meat broiling chamber 16 generally in the form of a tunnel extending horizontally the predominate lengthwise extent of the housing 12 from an entry opening 16' at the forward end of the housing 12 to respective discharging location 16" at the rearward end of the housing 12 (see FIG. 3). The meat-broiling chamber 16 occupies the predominant portion of the width of the housing 12.

An endless wire mesh conveyor 20 extends though the entire length of the meat broiling chamber 16. The conveyor 20 is supported by front and rear axle shafts 28, 30. The axle shaft 28 is rotatably supported horizontally at the forward side of housing 12 outwardly adjacent the chamber entrance opening 16' by forwardly extending housing flanges 32. The axle shaft 30 similarly is rotatably supported horizontally within the housing 12 by the outermost housing sidewalls 12' to extend laterally through the chamber 16 immediately adjacent the rearward end 16" of the housing 16 and in essentially the same horizontal plane and in axially parallel relation to the axle shaft 28.

In this manner, the conveyor 20 is arranged such that its upper conveyor run may travel along a horizontal food transport path in a horizontal plane lengthwise through the chamber 16 within the housing 12. The conveyor 20 within the chamber 16 is mounted in an idling manner about the axle shaft 28, but in contrast is trained about sprockets 26 fixed directly to the axle shaft 30 to rotate integrally therewith. The outermost end of the axle shaft 30 at the right side of the housing 12 also carries a sprocket 24 fixed directly to the shaft 30 by which the shaft 30 is driven by a motor (not shown) via an endless chain 38 trained about the sprocket 24 and the motor drive shaft 36, whereby the conveyor 20 is positively driven at a speed determined by the drive speed of the motor.

The meat broiling chamber 16 is equipped with a cooking arrangement for applying cooking energy therewithin to food articles being transported on the conveyor 20 from each opposite upper and lower side of the conveyor. Within the chamber 16, the cooking arrangement comprises a first plurality of electric heating elements 48 supported by the housing 12 in generally side-by-side horizontal alignment with one another at a spacing above the food transport path of the conveyor 20 and a second like plurality of electric heating elements 50 similarly arranged generally in side-by-side horizontal alignment at a spacing beneath the food transport path of the conveyor 20. The basic construction of each of the electric heating elements 48, 50, may be of a generally conventional type, such as electrical resistance heating elements. However, it is to be understood that any other form of heating or cooking elements may also be utilized, e.g., gas-fired burner assemblies fueled by natural gas or propane.

At the rearward end of the housing 12, a slide 40 is positioned in the housing 12 such that food items carried by the conveyor 20 are delivered onto the slide 40 at the terminal end of the upper conveyor run as the conveyor rounds the axle shaft 30. The slide 40 may be made in a suitable configuration and formed of a suitable material such as sheet metal to insure that food items delivered onto the slide 40 travel along the surface of the slide by gravity with sufficient force to transport the food items to a collection location 42 at the forward end of the slide for retrieval through an opening in the housing 12 at the forward end thereof below the housing flanges 32. To facilitate sliding of the food items, the surface of the slide 40 may be covered with an anti-friction material such as polytetraflouroethylene (TEFLON brand) or other suitable material to reduce the frictional forces between the surface of the slide 40 and the food items traveling thereover. Alternatively, the apparatus could provide a collection pan for the cooked food items at the rearward end of the housing 12.

Figure 5:
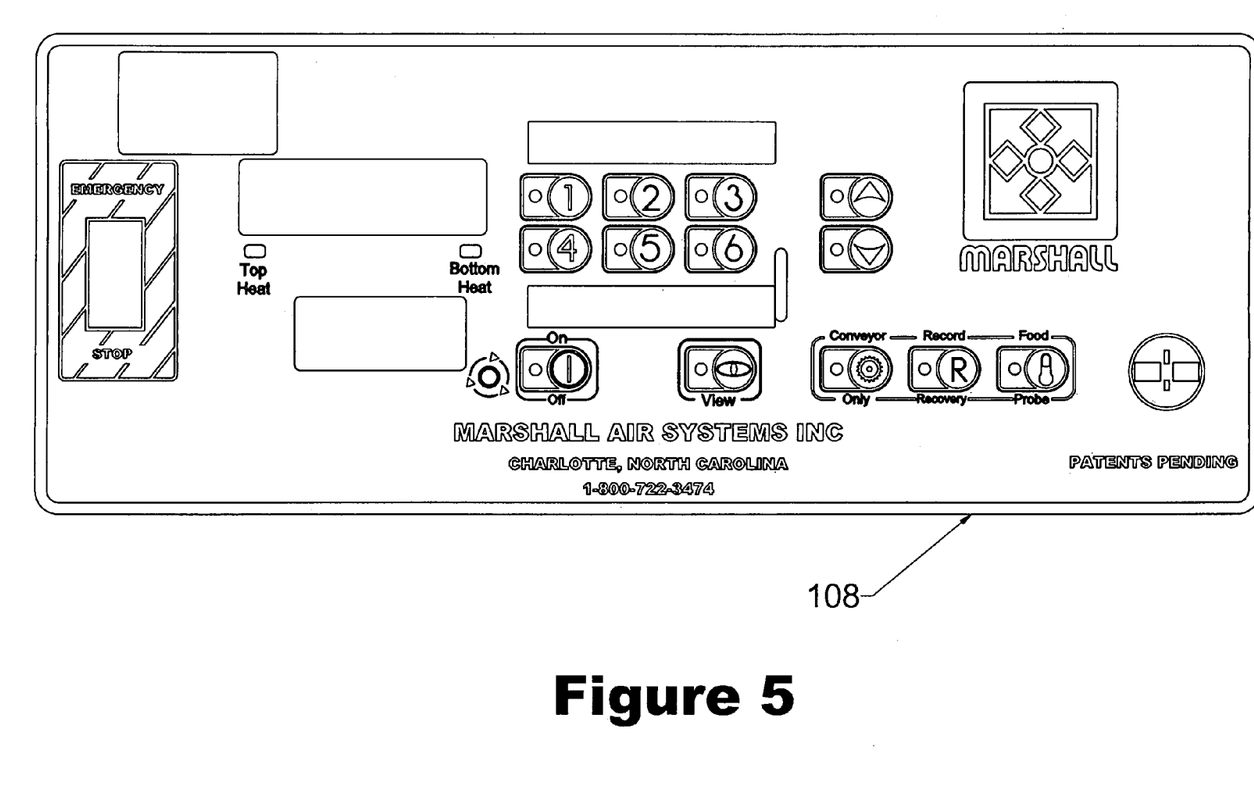
FIG. 5 is an elevational view of the keypad for actuating and controlling operation of the microprocessor-based controller for the cooking apparatus of FIGS. 1–4.
Figure 6:
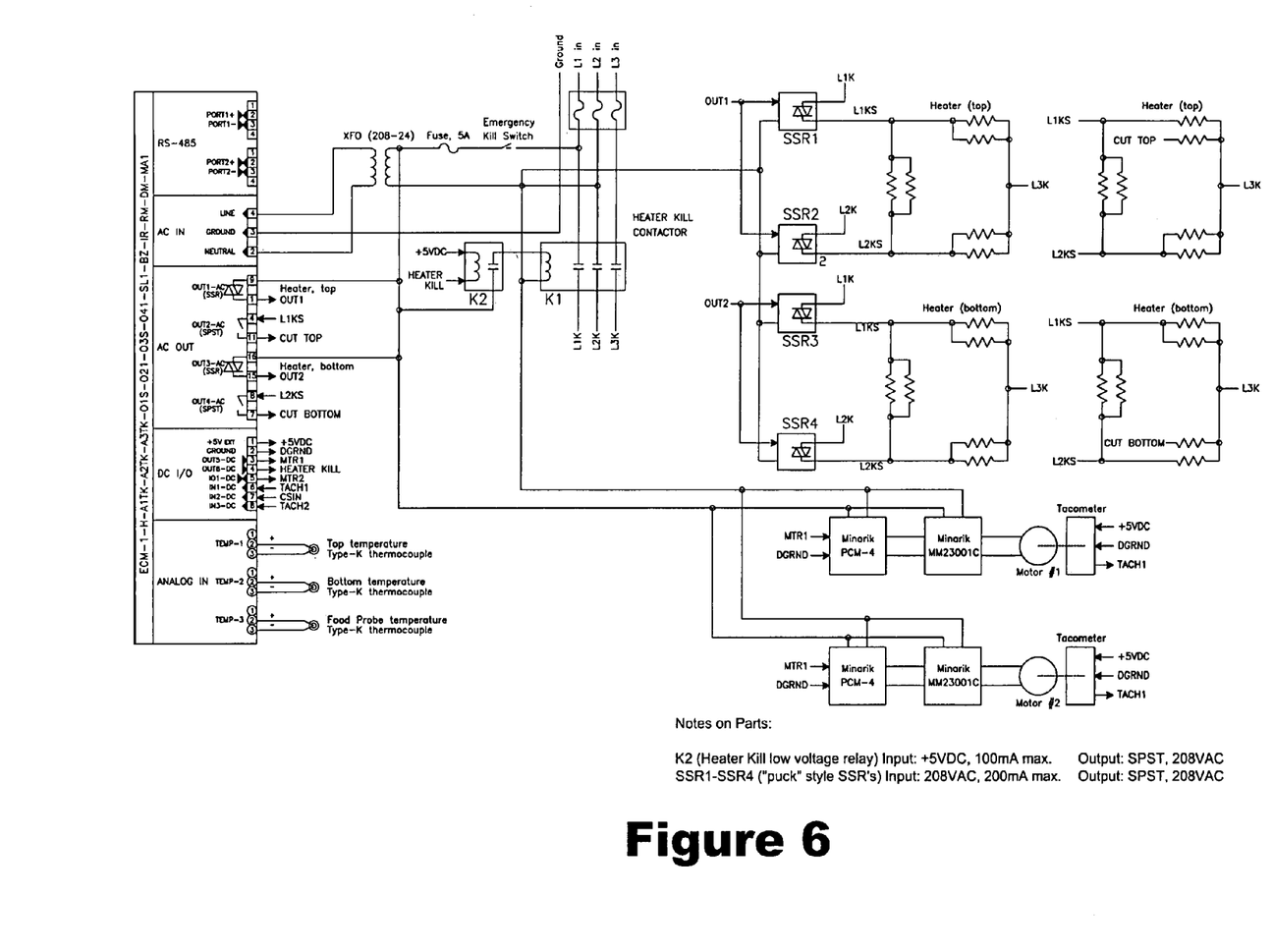
FIG. 6 is a wiring diagram which illustrates how the controller is to be connected within the broiler.

A significant feature of the present apparatus 10 is the provision of a microprocessor based controller unit 106 which provides for selective programmable variation and control of substantially all of the significant functions of the apparatus 10, including the broiling temperatures within the chamber 16, the traveling speed of the food conveyor 20, and controlled system shut-down of the apparatus 10, all as more fully described hereinafter. The controller unit 106 may comprise various conventional electronic microprocessor and memory components and associated programmable input means so long as capable of performing the control functions and logic of the present invention as described below. In the preferred embodiment, the various control functions and logic of the apparatus are input, actuated and controlled via a touch-type keypad 108 which may preferably be in a form and layout depicted in FIG. 5. The following describes the preferred operation and functional capabilities provided by the controller unit 106.

Introduction

To better grasp the functions and the rationale behind the various controller features required, the following describes the 2 major parts of the broiler: the conveyor subsystem, and the heating subsystem. The controller unit 106 controls the motor output for the conveyor 20 in a closed-loop fashion, using tachometer feedback. Also controlled are 2 heater zones, specifically the upper and lower electric heating elements. The controller is programmable, thus allowing it to be used on variants of the above broiler (i.e. single-zone, single-conveyor, gas model, different conveyor lengths, etc.).

1.1 Motor Control

The motor outputs (there can be up to 2 installed) are PWM signals (1 KHz, variable duty cycle). These drive external opto-isolators, which in turn drive the SCR DC motor drive. The motor is a 1/50 HP DC motor, which runs from about 9VDC to 110VDC. This motor is connected to a gearbox, which reduces the speed at a 192:1 ratio. In turn, this gearbox drives a chain with sprockets, and ultimately, the conveyor 20. The motor has a range of about 1 to 10 RPM for the output shaft speed of the gearbox.

The motor feedback is a Hall effect tachometer on the motor shaft 36 (as opposed to the gearbox output shaft, which is 192 times slower). The tachometer outputs 10 pulses per RPM. Thus, at maximum speed, the unit will send 19200 pulses per minute. At the slowest speed, this translates to 1920 pulses per minute.

From the user's perspective (in recipes), motor speed is simply expressed as a cooking time. The longer the time, the slower the motor will turn. There is a Low-level internal conversion factor that will take various mechanical variations of the broiler into consideration (sprocket diameter ratios, conveyor belt length, motor speed, etc.) Currently, the slowest speeds are about 8:00 and the fastest, about 0:45. The current motor allows about 10:1 speed ratio between the fastest and slowest speeds.

1.2 Heater Control

There are 2 heaters: a top heater comprised of the upper heater elements 48 (above the upper conveyor run) and a bottom heater comprised of the lower heater elements 50 (below the upper conveyor run). Each heater is independent of each other and has its own thermocouple. There are 6 individual heater elements 48 or 50 in each group, for a total of 12. Both temperatures are measured directly on their respective group of heating elements.

Temperatures are usually in the 1200° F.–1350° F. range. The heaters are driven by external "hockey puck" SSR's. However, since the failure mode of a power SSR is usually a short circuit, There is a "Heater Kill" contactor to be controlled when the unit goes in and out of operation. This contactor is a pre-caution against involuntary heater turn on.

It is also contemplated that one or both of the heater outputs could be replaced by a Gas Valve output for a gas fired broiler.

The Heater output can be controlled with either an On/Off algorithm (with a hysteresis) or a Fuzzy Logic algorithm (selectable in Low-level programming). Fuzzy Logic gives results similar to PID controls, but is easier to tune within a given system. The Fuzzy Logic output is useful in helping stabilize a system to a specific temperature, while minimizing ripple and over-/undershoots.

2 Inputs/Outputs Required

The broiler is installed on a 3-phase current (208VAC, 60 Hz) branch circuit. However, the controller is powered via an external 24VAC transformer. The following table summarizes the required and optional I/O's:

| Name | Function | I/O location on controller |
|---|---|---|
| Heater output (top) | Controls heat of top elements | OUT1-AC (SSR) |
| Current Sense Element kill (top) | Cuts out element on top heater | OUT2-AC (SPST relay) |
| Heater output (bottom) | Controls heat of bottom elements | OUT3-AC (SSR) |
| Current Sense Element kill (bottom) | Cuts out element on bottom heater | OUT4-AC (SPST relay) |
| Motor #1 PWM output | Runs motor #1 | OUT5-DC (via external drive) |
| Heater Kill contactor control | Cuts power to all heating elements | OUT6-DC (via external relay) |
| Motor #2 PWM output | Runs motor #2 | IO1-DC (via external drive) |
| Tachometer input #1 | Feedback for Motor #1 speed | IN1-DC |
| Current Sense input | Detects current drops in elements | IN2-DC |
| Tachometer input #2 | Feedback for Motor #2 speed | IN3-DC |
| Top temperature | Top zone temperature control | Analog input #1 (Type K) |
| Bottom temperature | Bottom zone temperature control | Analog input #2 (Type K) |
| Food Probe temperature | Food temperature | Analog input #3 (Type K) |

3 User Interface

The following is the user interface layout. The same layout applies to a vertical model. There is no software change involved since the same key layout (with a 90° counter-clockwise rotation) is used.

3.1 Keys 3.1.1 On/Off key

A normal press of this key turns on the controller. This causes the unit to start heating the elements and running the motors at the slowest recipe speed found (overcooked food is safer than undercooked food). This recipe is selected (its corresponding LED lights up) and the temperature set point is the one defined by this same recipe. At any time in On mode, the user can change the selected recipe.

When just turned On, the unit will scroll [PREHEAT] on the 1$^{st}$ display line of the controller keypad until the Soak Time has elapsed. After this time, unit will display either [READY], [LOW], or [HIGH] depending on the current temperature readings. When On, the unit activates the Heater Kill contactor, which in turn allows the heating elements to get power (through the SSR's).

A 3-second long press of the On/Off key turns off the unit. When the unit is turned Off, the Heater Kill output is deactivated to disable power to heating elements. The 1$^{st}$ display line will then blink [HOT] for the Cool Down period (heaters off, but the motor(s) is (are) still running at the fastest speed supported by the unit (see Minimum Time in Low-level programming)). At that point, the unit will then simply display [OFF] and all outputs will be disabled.

3.1.2 Recipe Keys

Six different cooking recipes are defined by a time and a temperature. The time basically sets the conveyor speed. If the broiler is a single conveyor model, then all 6 recipes control the conveyor speed. If the broiler is a dual conveyor model, then recipes 1 to 3 are for the left belt (Motor #1), and recipes 4 to 6 are for the right belt (Motor #2).

When the unit is READY a simple press of the recipe key will activate the selected recipe speed and temperature LOW and HIGH conditions may or may not be triggered).

When a specific recipe must be changed, keep its button pressed for 3 seconds, until the 1st parameter name scrolls on the 1st display line SET COOK TIME The recipe as well as the Up/Down LED's will also blink, indicating that they can be used. Pressing either Up or Down the 1st time simply makes the display switch to the parameter's value (preceded by an arrow, as in ▶ 4.25 to indicate a changeable value). Subsequent presses will then modify the parameter. If Up or Down are not pressed for 5 seconds, the display resumes scrolling the parameter name.

Each recipe has 3 programmable parameters. To switch from one to the next, press the recipe key. After the last parameter is programmed, the unit resumes normal operation.

SET COOK TIME
   SET TOP TEMPERATURE
   SET BOTTOM TEMPERATURE By default, all recipes are set as follows:
Cook time: 5.00
Top temperature: 1325° F.
Bottom temperature: 1250° F.

3.1.3 View Key

The View key allows a user to view actual or programmed system parameters. Changes cannot be made just by using this key.

In normal operation (On mode), pressing the View key followed by a Recipe key will start scrolling the message TOP TEMPERATURE also, the View and Up keys blink, indicating they can be used. The 2nd display line shows the current conveyor speed. Pressing the Up key causes the 1st display line to toggle between the message and the actual temperature value. Pressing the View key a 2nd time will display BOTTOM TEMPERATURE Again, the Up key toggles between this message and the actual temperature measured. A 3rd and final press of the View key resumes normal operation.

A 3-second long press of the View key allows users to see the current recipe programs without actually being able to change them. After this delay all 6 recipe LED's blink, allowing the user to select the wanted recipe. Once a recipe is selected, the procedure is the same for all recipes. The 1st parameter shown is COOK TIME By pressing the Up key, the user can view the parameter value that is currently programmed value (but cannot change it). The user simply waits for 5 seconds before the unit returns to the parameter name. Pressing the Recipe key a 2nd and 3rd time will bring up TOP TEMPERATURE and BOTTOM TEMPERATURE Again, using the Up key, the parameter value can be seen. Pressing the recipe key one last time returns the unit to normal operation.

If the unit is operating (i.e. On) when this feature is used, the 2nd display line always shows the current conveyor speed. If the unit is Off (or Hot), the conveyor speed is not shown.

3.1.4 Conveyor Only Key

The Conveyor Only key is only accessible from the Off state. This key allows the conveyor to be used without any heating. Pressing the key starts the conveyor at its slowest speed (as defined by the Low-level programming).

The word SPEED is displayed on the 1st display line. The current speed is displayed on the 2nd display line (expressed as a time), the flashing triangle indicating the speed can be changed using the Up and Down keys. Exit this mode by pressing Conveyor Only a 2nd time.

Note that at all times during the Conveyor Only mode, the motor tachometer feedback loop is disabled. In other words, the controller simply outputs the theoretical RPM derived from the selected speed and the K programmed into the Low-level programming.

3.1.5 Recovery Key (also Record Key—see 5.1.6 Step 3)

This key is available anytime. When pressed, the controller will list a log of the last 3 recovery times.

A recovery time is the time required for the temperature to go from 200° F. to 800° F. (temperature limits selectable in Low-level programming). A log exists for each heater (top and bottom). This is useful for service and HACCP purposes.

When the Recovery Key is pressed, the controller will successively display TOP 1, TOP 2, TOP 3, BOT 1, BOT 2, and BOT 3 ramp times, "1" being the most recent ramp logged. To actually see the logged time, press the Up key. After the last set is seen (BOT3), the unit resumes normal operation.

3.1.6 Food Probe Key

This key is useable only when the unit is On (and the Food probe is enabled in the Low-level programming). It is accessible in 2 modes: automatic or manual. In manual mode, it is up to the user to press the Food Probe key to initiate a log, whereas the automatic mode will remind the user (up to 6 times a day) to take a sample. Even in automatic mode, the user still has the capability to log extra samples manually as he/she wishes.

To do a manual log, the user must first make sure the temperature probe is correctly connected, and then press the Food Probe Key.

Step #1 This step prepares the controller for logging. It determines the equalization time that will be used later on in the process.

Display: SELECT RECIPE TO LOG is scrolled and recipe LED's blink.

Sound: No particular sound.

User Action: Select the Recipe corresponding to the sample that will be probed.

Step #2 This step starts the logging as such, and gives the user time to setup for the sampling.

Display: Shows INSERT PROBE Actual temperature can be seen when Up key is pressed.

The Up key and Record LED's blink.

Sound: No particular sound.

User Action: Insert the Food Probe into the sample according to local sanitary codes and normal restaurant procedures.

Step #3 In this step (basically a continuation of Step #2), the temperature continues being shown to the user. Nothing is being logged yet. The user must wait until a certain temperature is reached (that depends on what is being sampled (chicken, beef, etc.), as well as specific restaurant procedures).

Display: The 1st display line displays the temperature currently measured by the Food Probe.

The Record key LED also blinks.

Sound: No particular sound.

User Action: Keep Food Probe inserted. When temperature reaches a specific point (known to the user), the user presses the Record button.

Step #4 When the Record button is pressed, 2 things happen: the "Start temperature" is stored, and the equalization timer is started. This timer is low-level programmable on a per recipe basis. The controller now waits for the timer countdown to finish.

Display: The 1st display line keeps displaying the temperature currently measured by the Food Probe. However, there are no keys that function at this point.

Sound: A beep every 1 second until 5 seconds before end of timer. During last 5 seconds, beeps accelerate to 2 beeps per second.

User Action: Keep Food Probe inserted.

Step #5 In this last step, the actual log is written to memory. The temperature now displayed is logged as the "End temperature".

Display: Last temperature read when timer reached zero is displayed until Food Probe Key is pressed again. This exits Food Probe.

Sound: No particular sound.

User Action: Remove probe, and press any key to resume normal operation.

Data Logged

The following is logged each time a sample is taken (in Step #5): Date/time stamp (MM/DD/YY if English (degree F.), DD/MM/YY if Metric (degree C.) as well as HH:MM)

Recipe number (that was selected by user)

Top element temperature

Bottom element temperature

Food "Start temperature" (when user pressed Record)

Food "End temperature" (at the end of the equalization time)

NOTE: At the end of Step #5, the user can record another sample of same recipe by pressing Record again instead of Food Probe, which clears display of previous samples. Display then shows probe's current temperature and Steps 3, 4, and 5 are repeated.

3.1.7 Up and Down Keys

These keys are used to adjust the various system parameters when required. Time is incremented/decremented at 5-second intervals, and temperature at 5° F. (2° C.) intervals. These keys have a typematic feature associated with them. Keeping them pressed for more than 2 seconds causes the rate of change to accelerate to 25° F./10° C. (temperature), or 20 seconds (time) every 500 msec.

3.1.8 "Invisible" Logo Key

This key is not identified as such on the overlay. It is located where the lower diamond shape of the Marshall Air logo is. This key is meant to be "discrete", so as to not be normally used.

When the unit is On, a normal press of this key allows the user to bypass the PREHEAT step and go immediately into READY mode. This is used mostly when users are receiving a short course on how the unit operates, and the instructor does not wish to wait Soak Time minutes for READY appear.

In Off mode, a 20-second long press of the Logo and Food Probe keys will bring up the Low-level programming mode. This mode allows setting up the various system parameters to fine-tune a particular broiler model. See Section 0 for more details on the Low-level programming mode.

3.2 Display

3.2.1 General

In general, all messages are scrolled on the 1$^{st}$ display line (about 2 characters per second), and times are displayed on the 2$^{nd}$.

Some keys have a LED, which is used to indicate various situations.

On/Off LED: full on when broiler is On, otherwise Off.

Up/Down LED's: blink when Up/Down keys are expected.

Recipe LED's: on when a recipe is active, blinking when programming or viewing recipes.

Conveyor Only: blinking when feature is in use.

Recovery: full on when feature is in use.

Food Probe: normally off, blinking when waiting for user to insert probe, and full on when acquiring temperature.

View: full on when feature is in use.

Conveyor: this is a group of 3 LED's that simulate a rotating motion (about 2 changes per second). This is active whenever the controller is receiving pulses from all installed tachometers.

Top and Bottom Heater LED's: full on when the corresponding heaters are on, otherwise off.

Also, whenever the arrow symbol (ω) is displayed with the data, this means that this is a parameter being changed/adjusted.

3.2.2 Time Display

All conveyor speeds are displayed on the 2nd display line, and are limited to 9.59 All other times are displayed as MM.SS or HH:MM (in Low-level programming, this information is on the top display line, which has more characters available).

4 System States

There are several states of operation as follows:

4.1 Power-Up Mode

When a power-up occurs, there is a lamp test, where all LED's come on for 5 seconds (this includes all LED's in the two displays). Following the lamp test, the software number and revision are displayed. These are useful for troubleshooting purposes when several versions exist in the field. The first display line shows the software number and the second display line shows the revision in the format 1.03 Normally, officially "released" versions will be whole numbers (1.00, 2.00 etc.) and if a fraction occurs, these are beta versions.

Following this, the unit falls automatically into Off mode.

4.2 Off State

In this state, the heaters are disabled (Heater Kill relay is de-energized). Nothing is displayed, except for OFF on the 1$^{st}$ display line.

The motor(s) may be used (and the speed displayed on the 2$^{nd}$ display line) if the Conveyor Only function is used. Also the view and recovery keys may be used. The controller must be OFF to enter low-level programming.

4.3 On State

This is the normal cooking state. However, before displaying READY the unit must go through the PREHEAT mode. This can be bypassed by using the hidden Logo key.

In the On mode, 2 extra conditions may exist: LOW and HIGH. Both depend on the current set point, and the current temperature. If the difference between the set point and the current temperature exceeds the programmable thresholds, then either the LOW or HIGH messages are displayed. This warns the user to wait until the condition comes back before putting product onto the conveyor. These conditions are likely to occur when a recipe calls for different temperatures.

4.4 Hot State

This state is active after the unit is turned Off (or if an error occurs that causes the unit to shut-down). This state is basically a cool down step between the On and Off states. The conveyor continues to roll at the fastest speed it was set at, but the heaters are off (and the Heater Kill relay is deenergized). The display continuously shows ▭ until the Cool Down Time has elapsed. This can be bypassed by using the hidden logo key.

5 Other System Features

5.1 Internal Buzzer

The internal buzzer emits a very short beep whenever a key is pressed. When an alarm occurs, the buzzer will sound a tone (3 short beeps, 1 long pause, 3 short beeps, 1 long pause, etc.) In some cases (such as when using the Food Probe) the buzzer helps the user in accomplishing the task.

5.2 Motor Speed Calibration

To give as much flexibility as possible in the construction of broilers, a speed constant K is defined in the Low-level programming. This speed constant requires us to define the pulses (10 per motor RPM) required for 1 minute (60 seconds) of cook time. For example, if 2460 PPM (the value of K in pulses/minute is required for the unit to cook food during 1 minute, then this is the programmed constant. The controller software will convert this linearly to any other PPM as required by the recipe times. Using the parameters of the particular broiler and its K factor, a cook time of 2.45 will generate a tachometer output of about 6765 PPM. The equation used is the following:

PPM for a particular cook time=K×60/cook time where K the pulses per minute for a particular broiler model when it is operating at a speed corresponding to 1 minute cook time.

5.3 Food Probe

5.3.1 Automatic Logging

Automatic logging is exactly the same procedure as manual logging, except the controller actually reminds the user to do the job. The logging interval is programmable in the low-level programming. Up to 6 times (within a 24-hour period) can be programmed. Each time "slot" can be enabled (by programming a time from 12:00 AM to 11:59 PM) as well as disabled.

At the appointed time, if the controller is On, a message is scrolled (i.e. SAMPLE FOOD TEMPERATURES) and the buzzer beeps once per second until Food Probe is pressed. At this point the process is the same as the manual one described above.

5.3.2 Log Retrieval

There are basically 3 ways to "see" the logs: Palm™ IR link, RS-485, and manual. Manual log is the simplest, but requires more "paperwork". The user simply notes (on paper) the time and the temperatures displayed during logging. This is effectively simply using the controller as a precision thermometer.

When the Palm™ method is used, its software will automatically detect whether the logging option is installed and retrieve it if it is available. This data can then be downloaded to a PC via the normal HotSync® procedure. This data will then be available as a .CSV (comma-separated value) file that can be imported into many Windows® programs (MS Excel® being the most likely).

RS-485 log retrieval is similar to the Palm™ retrieval, except the software is running on a Windows® platform and communications is via the RS-485 link. The end result is the same: a .CSV file is created on the PC.

5.3.3 Log Capacity

The serial EEPROM used for storing the log information is 256 kB in size. A single log corresponds to approximately 16 bytes of information. Allowing for some overhead in managing this log, the total log capacity of this memory is about 16 000 logs. At 6 logs per day on a 24/7 basis, this is about 7 years worth of logging. This memory has a 10-year retention capacity when it is not powered.

Downloading the complete log (all of the 256 kB) to the Palm™ or PC takes about 5 minutes. Obviously, the smaller the log, the less time it will take to get the information out of the controller.

5.3.4 Clearing the Log

The log can only be cleared 2 ways: using the Palm™ handheld, or using the RS-485 (with a PC). In the Palm™ or PC software, there will be a command allowing the PDA or PC to tell the controller to clear its log.

The operator will be notified by scrolling CLEAR LOG when the log is 75% full. These words will toggle with ▭ and at 100% the words are LOG FULL and then the record key will not work, but LOG FULL will flash for 2 seconds any time record key is pressed.

5.4 Recovery Log

The controller always calculates the time it takes the temperatures to go from 200° F. to 800° F. (these limits are Low-level adjustable). This time is stored as MSG Only the last 3 recoveries are stored, and when the user requests them, the most recent is displayed 1st. This feature allows restaurant operators to gauge heating efficiency and whether employees follow normal startup procedures.

5.5 Dual Motor Units

When low-level programming dictates that there are 2 motors installed, some features will act slightly differently to accommodate this.

First, all recipes share the same top and bottom temperature settings (thus temperature becomes partly global). So, programming one recipe top temperature will change all other top temperatures too (the same applies to bottom). Motor speeds remain independent from each other.

The Conveyor key will activate both motors at the same speed. This speed remains adjustable using the Up and Down arrows. Also note that in a Dual conveyor machine, the Time Compensation feature is disabled.

Refer to table in Section 0 for summary of details.

5.6 Gas Units

Gas units can be gas-only, or combination units. In the case of a gas-only broiler, a single temperature (top) is used for all recipes (top and bottom). In this case, programming any one temperature sets all temperatures of all recipes (top and bottom). This is a true global temperature.

In the case of a combination unit, the top elements 48 are electric, and the bottom elements 50 are gas. If there is only one motor, then the top electric elements are all operable independently of each other, and the bottom gas elements are all operated at a uniform gas pressure which is common to all recipes. This is another case of partly global temperatures.

If 2 motors are installed, then the combination unit is different: all top temperatures are the same, and the common bottom temperature still applies.

The following table summarizes how the temperatures are managed in the recipes, depending on the broiler configuration.

| Broiler type | Element grouping | Single motor | Dual motor |
| --- | --- | --- | --- |
| Electric | Top:<br>Bottom: | Independent<br>Independent | Top global<br>Bottom global |
| Gas<br>"Combi" | Top and bottom:<br>Top (electric):<br>Bottom (gas): | All global<br>Independent<br>Bottom global | All global<br>Top global<br>Bottom global |

5.7 Time Compensation

There is a time compensation feature in the controller, which is entirely Low-level programmable. This feature allows the unit to compensate for medium/long term temperature variations due to quantity and/or type of food being fed into the unit.

Basically, if the top or bottom temperature (selectable in Low-level too) of the unit remains for [COMPENSATION TIME] above (or below) the set point plus (or minus) the [COMPENSATION THRESHOLD] then the unit will automatically subtract (or add) cooking time (defined as a percentage of the current recipe time, [COMPENSATION FACTOR] ) to the current recipe. This will not change the programmed time, but will shorten (or lengthen) the recipe until the temperatures return to normal. This is transparent to the user, as the user sees no change (unless he/she times the food through the unit). An example is as follows:

Assume the [COMPENSATION TIME] is set to 5 minutes, [COMPENSATION THRESHOLD] to 50° F., and [COMPENSATION FACTOR] to 10%. Also assume the current recipe is calling for 1275° F., and a speed of 2 minutes. If the current temperature falls below 1225° F. (set point minus 50° F.), the controller will start an internal countdown timer at 5 minutes. When this timer reaches zero (and the temperature has remained below 1225° F. all of this time), the unit will automatically lengthen the cooking time by adding 12 seconds (10% of 2 minutes) to the recipe time (but without changing the recipe program). Once the temperature goes back to set point (1275° F.), or a new recipe is selected, the process is cancelled and the compensation feature starts over.

Time Compensation is bilateral, meaning it works both ways. In the above example, if the temperature rises to 1325° F. (set point plus the Compensation Threshold), then the 5-minute timer starts. After this delay, if the temperature has not gone below 1325° F., then the cook time is shortened by the Compensation Factor. Again, once temperature goes back to the set point (1275° F.), then the compensation feature is turned off.

Each recipe can have its own compensation parameters, independent of all other recipes; however, the Time Compensation feature is disabled in the case of a dual-conveyor broiler.

5.8 Time and Date Setup

When the controller is in Off mode, the system Time and Date can adjusted by pressing the Off key for 3 seconds. The time is displayed on the 1st display line, and the HH are blinking. Using the Up and Down arrows, the hours are changed. Pressing view key moves the "focus" to the MM. Again, Up/Down adjusts this too. By pressing View key again, HH:MM are replaced by DD/MM (or MM/DD, depending on setting of temperature units) (1st display line) and YY (2nd display line). Again, use the View key to travel from one setting to another, and use the Up/Down keys to modify. The View key will return to HH:MM. Pressing the Off key again stores the new Time and Date, and returns to Off mode.

6 Diagnostics

This section describes the various diagnostics errors that are available.

6.1 Heater Temperature Probes

All probes are ungrounded type-K probes. All temperature readings normally associated with a type-K probe are considered valid by the controller. However, if the probes become disconnected or otherwise open, the controller will sound the buzzer and scroll [HOT]$_T$ [PROBE ERROR] on the 1st display line of the display. The defective probe number is displayed on the 2nd display line:

[1] is top heater temperature probe

[2] is bottom heater temperature probe

Pressing any key shuts the buzzer off, but will not remove the error message. The only way to remove the error message is to resolve the probe and/or connection problem.

When these heater probe errors occur, there are 2 possible ways to react, depending on the Probe Error parameter in the Low-level programming:

If Probe Error Action is set to 0 (default), the unit goes into shutdown via the [HOT] state. After the Cool Down delay, the error message becomes [OFF - PROBE]$_T$ [ERROR] instead of [HOT - PROBE ERROR]

If Probe Error Action is set to 1, then the unit continues operation, at 100% heater. The operator will most likely then have to adjust the recipe times, but at least the unit can still operate. Due to broiler construction, 100% heater for any amount of time is not a problem as the unit will not "burn" or otherwise ignite.

6.2 Food Probe Error

In normal operation, if the Food Probe is not connected, it does not trigger any errors (unlike the 2 other probes). However, as soon as the Food Probe key is used, if the controller detects the absence of the probe, it will signal the probe error (beep for a few seconds, display shows [FOOD PROBE ERROR]). It is important that the user connects the probe before pressing the Food Probe. The controller unit always remains functional, even though a Food Probe error occurs.

6.3 External DC Error

The DC I/Q connector has a +5VDC supply. This supply is internally protected against over-currents. Should this occur, the unit will internally disconnect the supply and report [HOT - EXTERNAL DC ERROR] The unit goes into shutdown (through [HOT] mode) and the only way to reset this is to resolve the problem (most likely a short). Since the buzzer is powered through the same +5VDC supply as the DC I/O connectors, the buzzer does not sound when this error occurs.

After the Cool Down delay, the error message becomes [OFF - EXTERNAL][DC ERROR] instead

[HOT-EXTERNAL DC ERROR]

7 Low-Level Programming

This mode of operation allows the installer (or factory) to program the various working parameters of the controller. First, the controller must already be in the Off state. Then, by keeping the hidden Logo and Food Probe keys pressed for 20 seconds, the first parameter will be displayed. The Up and Down LED's will be lit, indicating that the unit is ready for programming.

The parameter name always scrolls on the 1st display line. Then when the user presses either the Up or Down key the first time, the current value of the parameter is displayed. Subsequent presses of the Up and Down keys can then be used to modify the value to the required one. If the Up and Down keys are no longer pressed, the unit returns to scrolling the parameter name after 5 seconds. To proceed to the next parameter, press the hidden key again. To backtrack to a previous parameter, press the Food Probe key.

In all cases, if no keys have been pressed for 1 minute, or if the hidden key is pressed for 3 seconds, the unit will return to the Off mode.

Factory Default Reset: If the Food Probe key is pressed while the unit is in low level program, the Low-level programming is reset to the Factory default values (as listed here). This is a safeguard in case somebody has changed various (or too many) parameters and cannot recall what the previous configuration was. At least, the unit can be reset to "standardized" parameters.

7.1 Temperature Units

This setting allows a different temperature unit to be used for display.

Parameter name: TEMPERATURE UNITS
Allowed values: C or F
Factory default: F

7.2 Broiler Type

This setting allows setting the type of broiler.
(0) Electric only (2 probes, 2 electric heaters)
(1) Gas (1 probe, 1 gas valve output)
(2) Combi (2 probes, 1 electric heater, and 1 gas valve output)

Parameter name: BROILER TYPE
Allowed values: 0, 1, or 2
Factory default: 0

7.3 Number of Motors

This setting programs how many motors are installed on this particular broiler.

Parameter name: NUMBER OF MOTORS
Allowed values: 1 or 2
Factory default: 1

7.4 Motor #1 Speed Constant (K Factor)

This setting allows various broiler and motor configurations to use the same controller. This is the "Motor RPM required for 1 minute of cook time".

Parameter name: MOTOR 1 SPEED CONSTANT
Allowed values: 150 to 25000
Factory default: 1460

7.5 Motor #2 Speed Constant (K Factor)

This setting allows various broiler and motor configurations to use the same controller. This is the "Motor RPM required for 1 minute of cook time".

Parameter name: MOTOR 2 SPEED CONSTANT
Allowed values: 150 to 25000
Factory default: 1460

7.6 Soak Time

Defines the time required for the unit to reach proper internal temperatures at power-up. During this time, the unit displays PREHEAT.

Parameter name: SOAK TIME
Allowed values: 0.00 to 4:15 minutes
Factory default: 30.00

7.7 Cool Down Time

Defines the time required for the unit to reach safe handling temperatures when the unit is shut down. During this time, the unit displays HOT Parameter name: COOL DOWN TIME
Allowed values: 0.00 to 4:15 minutes
Factory default: 30.00

7.8 Soak Bypass

This allows the unit to automatic bypass the PREHEAT mode. This is useful in the case of a power "glitch" or brownout. The operator will not have to wait for the Soak Time to elapse, since the broiler is already hot. The unit simply checks for the temperature at power up, and if the temperature is within the last set point minus the set limit, the unit goes directly to READY mode.

Parameter name: SOAK BYPASS
Allowed values: 0° F. to 400° F. (0° C. to 222° C.)
Factory default: 100° F. (56° C.)

7.9 Food Probe Enable

This parameter will enable/disable the Food Probe subsystem. If set to 0, Food Probe is disabled.

Parameter name: FOOD PROBE
Allowed values: 0 or 1
Factory default: 1

7.10 Minimum Temperature

This is the minimum programmable temperature setting.

Parameter name: MINIMUM TEMPERATURE
Allowed values: 32° F. to 1400° F. (0° C. to 760° C.)
Factory default: 200° F. (93° C.)

7.11 Maximum Temperature

This is the maximum programmable temperature setting.

Parameter name: MAXIMUM TEMPERATURE
Allowed values: 32° F. to 1400° F. (0° C. to 760° C.)
Factory default: 1400° F. (760° C.)

7.12 Probe Error Action

This setting determines what will be done if a heater temperature probe error occurs:

If Probe Error Action is set to 0, the unit goes into shutdown via the HOT state. After the Cool Down delay, the error message contains OFF instead of HOT.

If Probe Error Action is set to 1, then the unit continues operation, at 100% heater. The operator will most likely then have to adjust the recipe times, but at least the unit can still operate. Due to broiler construction, 100% heater for any amount of time is not a problem as the unit will not "burn" or otherwise ignite.

Parameter name: PROBE ERROR ACTION
Allowed values: 0 or 1
Factory default: 0

7.13 Minimum Time

This is the minimum programmable time setting.

Parameter name: MINIMUM TIME
Allowed values: 0.00 to 9.59
Factory default: 0.45

7.14 Maximum Time

This is the maximum programmable time setting.

Parameter name: MAXIMUM TIME
Allowed values: 0.00 to 9.59
Factory default: 8.00

7.15 Low Temperature Threshold

This defines the temperature difference that triggers the LOW message.

Parameter name: LOW THRESHOLD
Allowed values: 0° F. to 200° F. (0° C. to 111° C.)
Factory default: 100° F. (55° C.)

7.16 High Temperature Threshold

This defines the temperature difference that triggers the HIGH message.

Parameter name: HIGH THRESHOLD
Allowed values: 0° F. to 200° F. (0° C. to 111° C.)
Factory default: 50° F. (28° C.)

7.17 Heater Hysteresis

This parameter fine-tunes the allowed "band" between the set point temperature and the temperature drop at which the heater output turns back on (when in On/Off heater control).

Parameter name: HEATER HYSTERESIS
Allowed values: to 0° F. to 200° F. (0° C. or 111° C.)
Factory default: 1° F. (1° C.)

7.18 Recovery Low Temperature

This parameter sets the lower limit at which the Recovery timer starts counting.

Parameter name: RECOVERY LOW TEMP
Allowed values: 200° F. to 800° F. (93° C. to 426° C.)
Factory default: 200° F. (93° C.)

7.19 Recovery High Temperature

This parameter sets the upper limit at which the Recovery timer stops counting.

Parameter name: RECOVERY HIGH TEMP
Allowed values: 300° F. to 1400° F. (148° C. to 760° C.)
Factory default: 800° F. (426° C.)

7.20 Fuzzy Logic

This parameter sets whether the controller controls the heaters using an On/Off algorithm or the Fuzzy Logic algorithm. A 1 enables the Fuzzy Logic control.

Parameter name: FUZZY LOGIC
Allowed values: 0 or 1
Factory default: 1

7.21 Compensation Source

This parameter sets which temperature input is used to do the Time Compensation algorithm.

Parameter name: COMPENSATION SOURCE
Allowed values: TOP or BOT
Factory default: BOT

7.22 Recipe Settings

This particular parameter is multiple, meaning that several values are programmed, for each recipe. Each recipe has a threshold temperature (negative or positive) at which the controller starts counting time (this threshold is relative to the current set point). If the timeout is reached, then the controller will automatically add (or subtract) a percentage time to the recipe to compensate for the temperature difference. The programmed recipe time is not changed. Only the current batches of food are affected, until the temperature gets back to the set point. Refer to Section 7.7 for more details on this feature.

Each recipe also has a 4th parameter, Equalization time, used in Food Probe data logging. See Section 0 for more details on this feature.

When the unit reaches this parameter, it displays RECIPE SETTINGS. The 6 recipe LED's will blink, thus asking the user to choose one. If the user simply ignores the recipe keys, the parameters are not changed. Use the recipe keys to travel through each parameter for each recipe. When done (at any time), simply press the hidden key twice to exit low-level programming.

For each recipe, the following are programmable:
Compensation threshold

If this parameter is set to 0 for any given recipe, all other parameters (Time and Factor) of the same recipe are set to 0 too. This accelerates clearing of the Time Compensation. This saves time for the person programming.

Parameter name: COMPENSATION THRESHOLD
Allowed values: to 0° F. to 200° F. (0° C. to 111° C.)
Factory default: 0° F. (0° C.)

7.22.1 Compensation Time

Parameter name: COMPENSATION TIME
Allowed values: 0.00 to 9.59
Factory default: 0

7.22.2 Compensation Factor

Parameter name: COMPENSATION FACTOR
Allowed values: 0 to 100
Factory default: 0

7.22.3 Equalization Time

This parameter defines how long the controller waits after the user presses the Record key before logging the "End temperature". This time is mandated by various local sanitation codes and specific restaurant procedures. Since what is cooked (i.e. chicken, beef, etc.) influences this time, this parameter is programmable for each recipe. When this menu is reached, all recipe LED's blink to let the programmer know all recipes have a value. Note that if any recipe equalization time is set to 0, only the End temperature will be logged (0 is logged into the Start Temperature).

Parameter name: EQUALIZATION TIME
Allowed values: 0 to 120 seconds
Factory default: 5

7.23 Auto-Log Setup

This parameter configures the controller for automatic logging or not. For convenience, a recipe key represents each of the 6 time "slots". So, selecting recipe 1 will program the 1st time slot, recipe 2 will program the 2nd slot, etc. For each slot, there is an OFF value, or a time ranging from 12:00 AM to 11:59 PM.

Parameter name: AUTO-LOG SETUP
Allowed values: OFF (disabled) or 12:00 AM to ________ (enabled)
Factory default: OFF

7.24 Food Probe Limit

This is used to limit the maximum temperature, which the display will display.

Parameter name: FOOD PROBE LIMIT
Allowed values: 0° F. to 2000° F. (0° C. to 1093° C.)
Factory default: 500° F.

8 Electrical Specifications 8.1. Electrical

Supply

Voltage: 24VAC (-SL1 is the low voltage option)

Frequency: 50/60 Hz

Input/Output Ratings

OUT1-AC: Solid State Relay, 250VAC, 200 mA max.

OUT2-AC: SPST relay, 250VAC, 8 A max.

OUT3-AC: Same ratings as for OUT 1-AC.

OUT4-AC: Same ratings as for OUT2-AC.

OUT5-DC: Non-isolated, open collector transistor 5VDC, 25 mA max.

OUT6-DC: Non-isolated, open collector transistor 5VDC, 100 mA max.

IO1-DC: Non-isolated, open collector transistor 5VDC, 25 mA max.

IN1-DC: Non-isolated, +5VDC max.

IN2-DC: Non-isolated, +5VDC max.

IN3-DC: Non-isolated, +5VDC max.

Analog Input Ratings

Input #1 (top): Ungrounded thermocouple, type K, 32–1650° F. (0–900° C.)

Maximum error: 0.5% of reading, excluding probe error

Input #2 (bottom): Ungrounded thermocouple, type K, 32–1650° F. (0–900° C.)

Maximum error: 0.5% of reading, excluding probe error

Input #3 (food probe):Ungrounded thermocouple, type K, 32–1650° F. (0–900° C.)

Maximum error: 0.5% of reading.

9 Serial Link Programming

There are 2 serial links on the controller. They can be used for a connection to a PC (via an RS-485 to RS-232 converter, bought separately). If required, the PC could be used to download programming information (and latest software) to the controller.

Advantages

As will thus be understood, the present invention therefore provides a number of distinct advantages over known conventional broiler control sytems.

1. The operator is assured that temperature-measuring equipment is always present at the location of the cooking appliance (in this case it is part of the cooking appliance).
2. In automatic mode, the operator is reminded as many as six times per day to check the food temperature. Restaurants that do track food temperature rely upon store personnel, watching the clock and taking the time from other activities in order to check food temperatures. Many times the operator fails to check food temperatures.
3. Pushing the record button will log the food temperature assuring the operator that the information has been captured and captured accurately.
4. The computerized broiler controller is very powerful and one possibility is that the device can be programmed with acceptable temperature values for each recipe. Furthermore, the operator may be given so many minutes in which to get acceptable temperature measurements and should the operator fail to achieve acceptable values in a given amount of time, appropriate action may be initiated, for instance the machine can be shut down and restarting it would not be possible unless a special code was entered into the controller.
5. It is also possible the machine may modify its recipe cooking time by an amount necessary to move unacceptable temperatures into acceptable ranges. For instance, six successive cooked samples could be measured and then the controller instructed to average the results and using that value adjust the cooking time in accordance with a previously established time stored in the computer algorithm. For instance in ¼ lb. frozen hamburgers it is known that within the range of about 140°–180°, each five seconds added to the cook time causes an increase in cooked food temperature of 2.5° F. Conversely decreasing cook time by five seconds would decrease food temperature by 2.5° F. Current industry standards call for 165° F. intervals on a hamburger +/−10° F.

The time compensation feature in effect provides the ability to speed up or slow down the cooking time should the broiler experience either a gradual falling off of temperature under extreme loads, or conversely an increase of temperature.

For instance, after cooking larger portions of chicken breasts for seven or eight minutes, the broiler may take increasingly longer to return to the set temperature. Part of the reason for this is that the apparatus stores a lot of heat in the sheet metal structure of the broiler. While the burners or electric heating elements themselves have to be powerful enough to recover, it tends to take longer under extended loads. Adding time to the programmed cook time is done in a transparent way to the operator.

An opposite situation can occur with small frozen hamburgers, e.g., 2 oz. hamburgers. As small hamburgers begin to shed large amounts of grease, the burning grease can actually contribute BTU's to the cooking process. With the time compensation routine, it is possible to establish a value of temperature above set point and a duration of which would trigger speeding up the conveyor while once again remaining transparent to the user.

In the current broiler configuration, electric heating elements are provided above and below the cooking conveyor. The top heaters and bottom heaters operate independently with each having a thermocouple attached directly to the surface of the heater. It is contemplated that adding another thermocouple will track the loss of heat in the sheet metal. The controller will then monitor the actual heater temperature (which can recover easily due to adequate energy input) and also monitor the sheet metal temperature and once again adjust the speed up or down to achieve consistently cooked product.

A significant feature of the invention is the ability to set the variables of temperature time and percentage speed change for each recipe since each type food may act completely different due to its weight, fat content, color and browning characteristics.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention.

The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In a cooking apparatus having a housing defining a cooking chamber with a food transport conveyor traveling through the chamber between opposing food cooking elements, a programmable control system comprising a food probe disposed externally of the cooking chamber and outside a discharge end of the food transport conveyor for insertion into cooked food items to ascertain the internal cooked temperature of the item after the food items have passed through the cooking chamber and a control program to automatically call for the probing of temperature readings of food items on a predefined schedule, and to automatically implement a corrective action if the ascertained internal cooked temperature of a cooked food item is outside a pre-determined cooking temperature range corresponding with the food item.

2. A programmable control system in a cooking apparatus according to claim 1, wherein the control program is selectively programmable to wait a pre-determined period of time after insertion of the probe into a cooked food item to take the temperature reading.

3. A programmable control system in a cooking apparatus according to claim 1, wherein the control program records a time and date with each temperature reading taken.

4. A programmable control system in a cooking apparatus according to claim 1, wherein the corrective action compensates for temperature degradation when the apparatus is under conditions of significant cooking loads.

5. A programmable control system in a cooking apparatus according to claim 4, wherein the corrective action controls the food cooking elements to achieve a consistent pre-determined set point temperature.

6. A programmable control system in a cooking apparatus according to claim 5, wherein the control program monitors deviations from the set point temperature and, upon a deviation which exceeds a pre-determined magnitude for greater than a pre-determined amount of time, the corrective action adjusts the speed of the conveyor to increase or decrease cooking time to compensate for the temperature deviation.

7. A programmable control system in a cooking apparatus according to claim 1, wherein the programmable control system comprises a control program to compensate for the possibility of a malfunction in any of opposing pluralities of the cooking elements on opposite sides of the conveyor wherein, in the event one cooking element on one side of the conveyor malfunctions, a corresponding heating element on the opposite side of the conveyor is deactivated and simultaneously the conveyor speed is adjusted to slow the conveyor travel in order to compensate for the reduction in heating, thereby to maintain balanced and thorough cooking on each side of the food.

8. A programmable control system in a cooking apparatus according to claim 1, wherein the programmable control system comprises a control program for automatically shutting down the apparatus when an acceptable cooking temperature is not reached within a predetermined period of time after having automatically called for the probing of temperature readings of food items.

9. A programmable control system in a cooking apparatus according to claim 1, wherein the programmable control system comprises a control program for modifying cooking time to adjust the cooked temperature of the food items.

10. A programmable control system in a cooking apparatus according to claim 1, wherein the control program records the temperature readings taken.

11. In a cooking apparatus having a housing defining a cooking chamber with a food transport conveyor traveling through the chamber between opposing food cooking elements, a programmable control system comprising a food probe for insertion into cooked food items to ascertain the internal cooked temperature of the item and a control program to automatically call for the probing of temperature readings of food items on a predefined schedule and to record the temperature readings taken, wherein the control program is selectively programmable to wait a pre-determined period of time after insertion of the probe into a cooked food item to take the temperature reading.

12. A programmable control system in a cooking apparatus according to claim 11, wherein the control program records a time and date with each temperature reading taken.

13. A programmable control system in a cooking apparatus according to claim 11, wherein the control program monitors deviations from a consistent pre-determined set point temperature of the cooking apparatus and, upon a deviation which exceeds a pre-determined magnitude for greater than a pre-determined amount of time, adjusts the speed of the conveyor to increase or decrease cooking time to compensate for the temperature deviation.

14. A programmable control system in a cooking apparatus according to claim 11, wherein the programmable control system comprises a control program to compensate for the possibility of a malfunction in any of opposing pluralities of the cooking elements on opposite sides of the conveyor wherein, in the event one cooking element on one side of the conveyor malfunctions, a corresponding heating element on the opposite side of the conveyor is deactivated and simultaneously the conveyor speed is adjusted to slow the conveyor travel in order to compensate for the reduction in heating, thereby to maintain balanced and thorough cooking on each side of the food.

15. A programmable control system in a cooking apparatus according to claim 11, wherein the programmable control system comprises a control program for automatically shutting down the apparatus when an acceptable cooking temperature is not reached within a pre-determined period of time after having automatically called for the probing of temperature readings of food items.

16. A programmable control system in a cooking apparatus according to claim 11, wherein the programmable control system comprises a control program for modifying cooking time to adjust the cooked temperature of the food items.

17. A method of monitoring and regulating the parameters of a cooking process in a conveyorized cooking apparatus having a housing defining a cooking chamber, the method comprising the steps of:
 (a) conveying a food item through the cooking chamber of the conveyorized cooking apparatus;
 (b) discharging the food item from the cooking chamber;
 (c) automatically calling for the probing of a temperature reading of the food item in accordance with a pre-defined schedule;
 (d) after discharging of the food item from the cooking chamber, probing the internal cooked temperature of the food item with a food probe externally of the cooking chamber to ascertain an internal cooked temperature of the food item;

(e) automatically comparing the internal cooked temperature of the food item with a pre-determined cooked temperature range to determine if the internal cooked temperature is outside the pre-determined cooking temperature range; and
(f) automatically implementing a corrective action if the internal cooked temperature is outside the pre-determined cooking temperature range.

18. A method of monitoring and regulating the parameters of a cooking process in a conveyorized cooking apparatus in accordance with claim 17 further comprising the step of automatically recording the internal cooked temperature of the food item.

\* \* \* \* \*